UNITED STATES PATENT OFFICE.

HOWARD SPENCE, OF MANCHESTER, ENGLAND, ASSIGNOR TO HIMSELF, FRANCIS MUDIE SPENCE, AND DAVID DICK SPENCE, OF SAME PLACE.

TITANIUM COMPOUND AND METHOD OF MAKING SAME.

SPECIFICATION forming part of Letters Patent No. 670,819, dated March 26, 1901.

Application filed June 3, 1899. Serial No. 719,299. (No specimens.)

*To all whom it may concern:*

Be it known that I, HOWARD SPENCE, a subject of the Queen of Great Britain and Ireland, residing at the Manchester Alum Works, Manchester, in the county of Lancaster, England, have invented certain Soluble Compounds of Titanium and Process of Producing the Same, of which the following is a specification.

Hitherto no soluble compound of titanium has been produced on a large scale as an article of commerce, and the laboratory processes which have been described are not suitable for the production of such compounds except at a price which would be, practically speaking, prohibitive.

Now this invention relates to the production of soluble compounds of titanium having the general formula $TiO_2, 2(SO_3), X_2O$, where X represents either sodium, potassium, or ammonium ($NH_4$.) From these soluble and industrially useful compounds of titanium (respectively, a crystalline compound of titanic acid, sulfuric acid, and soda, a crystalline compound of titanic acid, sulfuric acid, and potash, and a crystalline compound of titanic acid, sulfuric acid, and ammonia) various other useful compounds of titanium may also be produced. It should be noted that the potash salt differs from the well-known compound of titanic acid, sulfuric acid, and potash mentioned in the text-books, the formula of the latter being $TiO_2, 3(SO_3), K_2O$, while that of the former is $TiO_2, 2(SO_3), K_2O$. In the process for producing the compounds now under description a suitable material containing titanic acid—such, for instance, as the waste solid product which results when manufacturing from bauxite, either sulfate of alumina or what is known commercially as "aluminoferric" or other similar aluminous compounds (and which waste solid product may be obtained in a form containing a considerable percentage of titanic acid)—is acted upon by fluxing it with acid sodium sulfate or acid potassium sulfate (approximately of the composition $NaHSO_4$ or $Na_2S_2O_7$ or $KHSO_4$ or $K_2S_2O_7$ or with acid ammonium sulfate,) whereby the titanic acid contained in the material treated is dissolved out or rendered soluble. The acid ammonium sulfate is not so suitable for the fluxing process as the corresponding acid sodium sulfate or acid potassium sulfate owing to the volatility of ammonium compounds generally. Therefore, although the use of acid ammonium sulfate will give a satisfactory decomposition, it is better to employ acid sodium sulfate or acid potassium sulfate when carrying out the fluxing operation.

In carrying out this invention the titanic acid may be obtained from substances other than bauxite, provided the titanic acid present in such substances is capable of being readily attacked by an acid sulfate of an alkali and provided also that iron or other impurities are not present in detrimental quantities. When the titanic acid is not present in a readily attackable form—as, for example, in Rutile—the substance may for the purpose of rendering the titanic acid more readily attackable be subjected to a suitable preliminary treatment. This treatment may—for example, in the case of Rutile—consist in fritting or fusing it with carbonate of soda and subsequently lixiviating the product with water to remove as much as possible of the soda. When iron or other substances are present in injurious quantities, they may be removed by any known or suitable method, depending upon the particular substance being treated.

When treating waste material from bauxite, if such waste material contains twenty per cent. or thereabout (when dried) of titanic acid a suitable proportion of acid sodium sulfate would be about five parts, by weight, either in the form of the acid by-product from the manufacture of nitric acid or of the similar by-product from the decomposition of the nitrate of soda used in the manufacture of sulfuric acid by the chamber process to one part, by weight, of the above-named waste material when dried. It is desirable that the acid sulfate employed in attacking the material containing titanic acid should contain sufficient sulfuric acid to form approximately an acid sulfate or bisulfate, ($Na_2S_2O_7$ or $K_2S_2O_7$.) The relative proportions employed of the acid sulfate of the alkali and of the material containing titanic acid may be varied considerably, according to the nature of the material and the percentage of titanic acid it contains, so long as the acid attack be such as to insure that the titanic acid in the resulting product shall be in the soluble condition which is necessary for the subsequent operations. If during the fluxing operation a considerable proportion of the loosely-combined sulfuric acid of the acid sulfate employed is driven off by the heat necessary for the reaction, such loss may be compensated for by the addition of more sulfuric acid during such operation. The sulfuric acid which may be so driven off during the process may be condensed by any suitable means.

The fluxing operation may be carried out in any suitable manner. Conveniently it may be done in an iron vessel, such as is used in the manufacture of nitric acid, taking care that the temperature employed shall be sufficient to maintain the acid sulfate in a state of fusion. It may, for example, be carried out in connection with the manufacture of nitric acid by decomposing the nitrate of soda employed with excess of sulfuric acid in the presence of the material (in a powdered condition) containing titanic acid and allowing the fused acid product to act upon such material. It may also, for example, be carried out in a similar manner in conjunction with the decomposition of common salt (NaCl) by means of sulfuric acid, employing such proportions that acid sodium sulfate is produced and allowed to act upon the titanic-acid-containing material. The resulting fluxed product thus obtained is treated when cold with a suitable solvent in such a manner as to dissolve out the soluble matter and at the same time to prevent the separation of titanic acid. This may be conveniently carried out by employing as the solvent hot or boiling water or hot or boiling dilute sulfuric acid, the separation of the titanic acid being prevented by not allowing the acidity of the solution (as determined by the well-known method of titrating a small portion of the liquid by standard alkali with methyl orange as indicator) to fall below the point at which on boiling the liquor and subsequently concentrating it the precipitation of titanic acid in an insoluble form would result. Having dissolved the soluble matter, as above described, the next step is to separate the undissolved matter from the liquor by filtration or other suitable means. The solution thus free from insoluble matter is next concentrated by evaporation—i. e., by boiling the solution in the ordinary way—to effect the separation from it of the soluble crystalline compound of titanic acid, sulfuric acid, and the alkali employed in the acid sulfate which it is the object of this invention to obtain.

Assuming that acid sodium sulfate is employed, then the soluble crystalline compound will consist of titanic acid, sulfuric acid, and soda. When employing the proportions given above, a separation of the crystalline compound from the solution is largely effected when the solution is evaporated to a specific gravity of about 1.4, (while hot.) At this stage the temperature of the liquor is about 110° centigrade. Of the two acid sulfates (respectively, acid sodium sulfate and acid potassium sulfate) the acid sodium sulfate is considered the more suitable to employ, because it is relatively the cheaper.

It is to be noted that the presence of a considerable proportion of alumina in the material containing titanic acid is objectionable, as it interferes largely with the separation of the crystalline compound. If present in large proportion, it would very greatly reduce the quantity obtainable. The crystalline compounds separate out mainly during concentration of the solution obtained by the above-described methods. If the solution contains impurities in such proportion as to be detrimental, the crystalline crop of the compound may be removed by well-known means from the liquor while the latter is hot. If, however, the solution is comparatively pure, it may be allowed to cool in order to obtain as large a yield as possible of the compound. The product thus obtained may be further purified, if necessary, by dissolving it in dilute sulfuric acid of about 1.2 specific gravity, concentrating the solution so obtained as before, and again crystallizing out the compound. It is found that this result is greatly assisted by the addition of sufficient neutral or normal sulfate of the alkali employed to convert, potentially, into an acid sulfate some or all of the sulfuric acid that has been added in the form of dilute acid, as above described. The addition of sufficient neutral sulfate of the alkali to potentially form about two-thirds of the sulfuric acid so added into an acid sulfate or bisulfate ($NaHSO_4$ or $KHSO_4$ or $NH_4HSO_4$) is a proportion found to give a good result. The mother-liquor resulting from the recrystallization or recrystallizations may (after concentration) be again suitably employed for attacking fresh material in the fluxing process in order to recover the valuable materials contained in the liquor.

The soluble crystalline compound of titanic acid, sulfuric acid, and of the alkali employed is in a very suitable form for use in the arts as a soluble titanium compound—such, for example, as a mordant for colors—and is also suitable for the preparation (by well-known methods of chemical reaction or of double decomposition) of other useful compounds of titanium.

What I claim is—

1. The hereinbefore-described process for the production of new soluble compounds of titanic acid, sulfuric acid, and alkali having as set forth the formula $TiO_2 2(SO_3)X_2O$ which consists in fluxing a suitable titanic-acid-containing substance with an acid sulfate of the alkali, maintaining in the fluxed mass an amount of sulfuric acid sufficient to prevent the separation of titanic acid in an insoluble form, allowing the fluxed mass to cool, treating the fluxed mass with a solvent, maintaining in the liquor an amount of sulfuric acid sufficient to prevent the precipitation of titanic acid in an insoluble form, separating the undissolved matter from the liquor, concentrating the solution, and removing the crystalline compound formed.

2. The hereinbefore-described process for the production of new soluble compounds of titanic acid, sulfuric acid, and alkali having as set forth the formula $TiO_2 2(SO_3)X_2O$ which consists in rendering titanic acid in the titanic-acid-containing material readily attackable by an acid sulfate, fluxing the resulting solid product with an acid sulfate of the alkali maintaining in the fluxed mass an amount of sulfuric acid sufficient to prevent the separation of titanic acid in an insoluble form, allowing the fluxed mass to cool, treating the fluxed mass with a solvent, maintaining in the liquor an amount of sulfuric acid sufficient to prevent the precipitation of titanic acid in an insoluble form, separating the undissolved matter from the liquor, concentrating the solution, and removing the crystalline compound formed.

3. As a new article of manufacture the new soluble compound of titanic acid, sulfuric acid and alkali having as set forth the formula $TiO_2, 2(SO_3), X_2O$.

Signed at Manchester, England, this 18th day of May, 1899.

HOWARD SPENCE.

Witnesses:
 REGINALD GREGG,
 MATTHEW BURTON ROBINSON.